(12) United States Patent
Doumaux et al.

(10) Patent No.: US 10,829,659 B2
(45) Date of Patent: Nov. 10, 2020

(54) METHOD OF INKJET PRINTING AND FIXING COMPOSITION

(71) Applicant: Hewlett-Packard Development Company, L.P., Spring, TX (US)

(72) Inventors: Howard Doumaux, San Diego, CA (US); Eduardo Amela Conesa, Sant Cugat del Valles (ES); Andreas Muller, Sant Cugat del Valles (ES); Kai-Kong Iu, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/331,062

(22) PCT Filed: Jan. 31, 2017

(86) PCT No.: PCT/US2017/015907
§ 371 (c)(1),
(2) Date: Mar. 6, 2019

(87) PCT Pub. No.: WO2018/143962
PCT Pub. Date: Aug. 9, 2018

(65) Prior Publication Data
US 2019/0233671 A1    Aug. 1, 2019

(51) Int. Cl.
*B41J 2/14* (2006.01)
*C09D 11/40* (2014.01)
(Continued)

(52) U.S. Cl.
CPC .............. *C09D 11/40* (2013.01); *B41J 2/145* (2013.01); *B41M 5/0017* (2013.01);
(Continued)

(58) Field of Classification Search
None
See application file for complete search history.

(56) References Cited

U.S. PATENT DOCUMENTS

| 3,437,502 A | 4/1969 | Warner |
| 4,186,178 A | 1/1980 | Oberlander |

(Continued)

FOREIGN PATENT DOCUMENTS

| EP | 0728779 | 8/1996 |
| EP | 1403341 | 3/2004 |

(Continued)

OTHER PUBLICATIONS

Disperal®/Dispal® High Purity Dispersible Aluminas, Sasol, Jan. 2003, 10 pages < http://www.sasoltechdata.com/tds/DISPERAL_DISPAL.pdf >.

(Continued)

*Primary Examiner* — Erica S Lin
(74) *Attorney, Agent, or Firm* — HP Inc. Patent Department

(57) ABSTRACT

Herein is described a method of inkjet printing, and compositions and inksets for use in the method, the method comprising: printing onto a non-porous substrate an inkjet fixing composition comprising a cationic polymer in an amount of less than 5 wt. %; an organic acid in an amount of 3 wt. % or less; and a liquid vehicle; and printing a latex-containing inkjet ink composition onto the non-porous substrate.

15 Claims, 1 Drawing Sheet

(51) Int. Cl.

| | | |
|---|---|---|
| *C09D 11/54* | (2014.01) | |
| *B41M 7/00* | (2006.01) | |
| *C09D 11/38* | (2014.01) | |
| *B41J 2/145* | (2006.01) | |
| *B41M 5/00* | (2006.01) | |
| *C09D 11/033* | (2014.01) | |
| *C09D 11/037* | (2014.01) | |
| *C09D 11/102* | (2014.01) | |
| *C09D 11/107* | (2014.01) | |
| *C09D 11/322* | (2014.01) | |

(52) U.S. Cl.
CPC ........ *B41M 5/0023* (2013.01); *B41M 7/0018* (2013.01); *C09D 11/033* (2013.01); *C09D 11/037* (2013.01); *C09D 11/102* (2013.01); *C09D 11/107* (2013.01); *C09D 11/322* (2013.01); *C09D 11/38* (2013.01); *C09D 11/54* (2013.01)

(56) References Cited

U.S. PATENT DOCUMENTS

| | | | |
|---|---|---|---|
| 4,495,238 A | 1/1985 | Adiletta | |
| 4,630,076 A | 12/1986 | Yoshimura | |
| 5,990,202 A | 11/1999 | Nguyen et al. | |
| 6,184,268 B1 | 2/2001 | Nichols et al. | |
| 6,302,536 B1 | 10/2001 | Sarma et al. | |
| 6,498,202 B1 | 12/2002 | Sun et al. | |
| 6,709,095 B2 | 3/2004 | Sago et al. | |
| 6,779,884 B1* | 8/2004 | Ma | B41J 2/00 347/100 |
| 6,783,580 B2 | 8/2004 | Tyvoll et al. | |
| 6,906,019 B2 | 6/2005 | Nitzan et al. | |
| 6,936,648 B2 | 8/2005 | Bagwell et al. | |
| 7,129,284 B2 | 10/2006 | Ma et al. | |
| 7,246,896 B2 | 7/2007 | Askeland et al. | |
| 7,388,040 B2 | 6/2008 | Sader et al. | |
| 7,696,262 B2 | 4/2010 | Cagle et al. | |
| 7,744,205 B2 | 6/2010 | Sarkisian et al. | |
| 8,113,643 B2 | 2/2012 | Sarkisian et al. | |
| 8,114,923 B2 | 2/2012 | Sarkisian et al. | |
| 8,267,505 B2 | 9/2012 | Jolly et al. | |
| 8,440,742 B2 | 5/2013 | Cagle et al. | |
| 8,540,358 B2 | 9/2013 | Mozel et al. | |
| 8,746,869 B2 | 6/2014 | Matsuyama et al. | |
| 8,777,390 B2 | 7/2014 | Bruinsma et al. | |
| 8,783,842 B2 | 7/2014 | Ingle et al. | |
| 8,801,162 B2 | 8/2014 | Matsumoto et al. | |
| 8,857,962 B2 | 10/2014 | Goto et al. | |
| 9,062,217 B2 | 6/2015 | Gotou et al. | |
| 9,133,355 B2 | 9/2015 | Brandstein et al. | |
| 9,187,667 B2 | 11/2015 | Doumaux et al. | |
| 9,278,515 B2 | 3/2016 | Sarkisian et al. | |
| 2003/0087991 A1 | 5/2003 | Engel et al. | |
| 2004/0063809 A1 | 4/2004 | Fu et al. | |
| 2004/0166252 A1 | 8/2004 | Takashima et al. | |
| 2005/0176847 A1 | 8/2005 | Cagle | |
| 2005/0206705 A1 | 9/2005 | Ma et al. | |
| 2006/0092251 A1 | 5/2006 | Prasad et al. | |
| 2007/0084380 A1 | 4/2007 | Cagle et al. | |
| 2009/0246377 A1 | 10/2009 | Robertson et al. | |
| 2009/0295847 A1 | 12/2009 | Mukai et al. | |
| 2010/0173077 A1 | 7/2010 | Ming | |
| 2010/0231671 A1 | 9/2010 | Anton et al. | |
| 2011/0001779 A1* | 1/2011 | Kida | B41J 2/2114 347/42 |
| 2011/0071249 A1 | 3/2011 | Bui et al. | |
| 2011/0234689 A1* | 9/2011 | Saito | C08F 220/30 347/21 |
| 2011/0303113 A1 | 12/2011 | Sarkisian et al. | |
| 2011/0318551 A1 | 12/2011 | Nakagawa | |
| 2012/0092413 A1 | 4/2012 | Kawamura | |
| 2013/0072614 A1 | 3/2013 | Lindstrom et al. | |
| 2013/0079447 A1 | 3/2013 | Koike | |
| 2013/0201252 A1 | 8/2013 | Namba | |
| 2013/0222503 A1 | 8/2013 | Okuda | |
| 2013/0330526 A1 | 12/2013 | Song et al. | |
| 2014/0141212 A1 | 5/2014 | Fu et al. | |
| 2014/0204155 A1 | 7/2014 | Vanbesien | |
| 2014/0220315 A1 | 8/2014 | Zhang et al. | |
| 2015/0225586 A1 | 8/2015 | Ingle et al. | |
| 2015/0252205 A1 | 9/2015 | Sarkisian et al. | |
| 2015/0267073 A1 | 9/2015 | Zhou et al. | |
| 2015/0273853 A1 | 10/2015 | Govyadinov et al. | |
| 2015/0275007 A1 | 10/2015 | Cagle et al. | |
| 2015/0283828 A1 | 10/2015 | Aoai et al. | |
| 2015/0368488 A1 | 12/2015 | Robello et al. | |
| 2016/0185124 A1 | 6/2016 | Govyadinov | |
| 2016/0257154 A1 | 9/2016 | Miyamachi et al. | |
| 2016/0312404 A1 | 10/2016 | Pan et al. | |
| 2016/0319147 A1 | 11/2016 | Chen et al. | |
| 2016/0326391 A1 | 11/2016 | Doumaux et al. | |
| 2016/0333209 A1 | 11/2016 | Shimono et al. | |
| 2017/0355867 A1 | 12/2017 | Kasperchik | |

FOREIGN PATENT DOCUMENTS

| | | |
|---|---|---|
| EP | 1403342 | 3/2004 |
| EP | 1561788 | 8/2005 |
| EP | 1586454 | 10/2005 |
| EP | 1403346 | 11/2006 |
| EP | 1923435 | 5/2008 |
| EP | 2508577 | 10/2012 |
| EP | 2621731 | 8/2013 |
| JP | 2005126466 | 5/2005 |
| JP | 2014091795 | 5/2014 |
| JP | 2014240451 | 12/2014 |
| RU | 2588245 | 6/2016 |
| SU | 891732 | 12/1981 |
| WO | WO 03031191 | 4/2003 |
| WO | WO 2007112337 | 10/2007 |
| WO | WO 2009128833 | 10/2009 |
| WO | WO 2011028201 | 3/2011 |
| WO | WO 2012008978 | 1/2012 |
| WO | WO 2014042653 | 3/2014 |
| WO | WO 2015023274 | 2/2015 |
| WO | WO 2015041702 | 3/2015 |
| WO | WO 2015134020 | 9/2015 |
| WO | WO 2015142335 | 9/2015 |
| WO | WO 2016092309 | 6/2016 |
| WO | WO 2016130158 | 8/2016 |
| WO | WO 2016175738 | 11/2016 |
| WO | WO-2017009601 | 1/2017 |
| WO | WO 2017014747 | 1/2017 |
| WO | WO 2018143957 | 8/2018 |

OTHER PUBLICATIONS

International Search Report and Written Opinion for International Application No. PCT/US2017/015907 dated Oct. 12, 2017, 6 pages.

\* cited by examiner

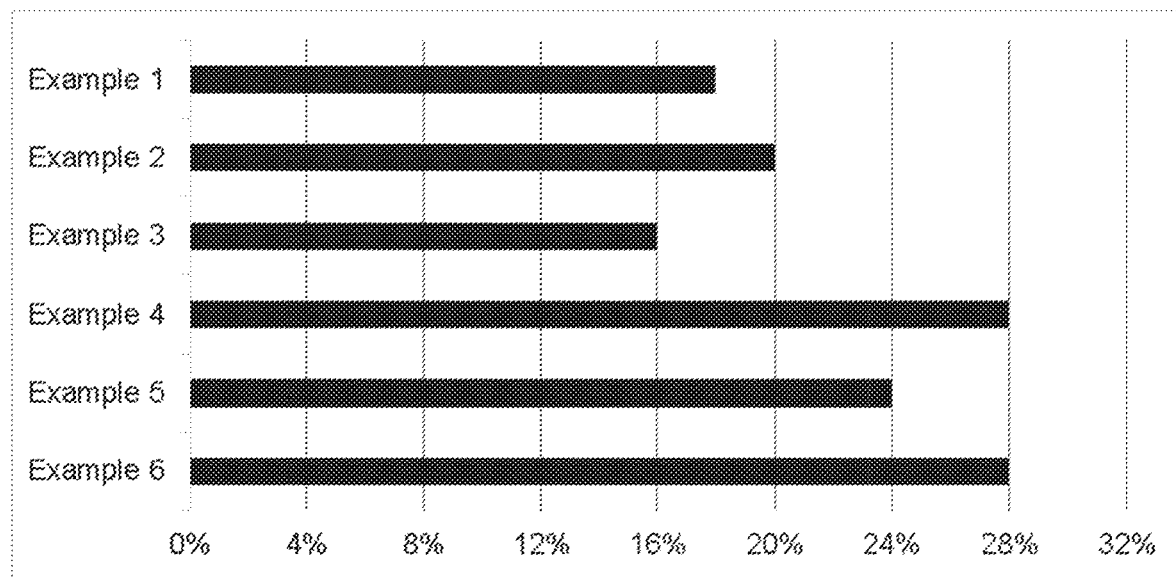

METHOD OF INKJET PRINTING AND FIXING COMPOSITION

BACKGROUND

Inkjet printing takes aqueous inks from a reservoir of an ink cartridge and passes it through a printhead to be jetted onto the print substrate through a print nozzle.

On porous papers, ink drying occurs primarily by ink penetration into the media pore structure, and control of image quality aspects is a strong function of the rate of ink penetration into the media. Thus, optimization of the penetration rate is used for attributes such as color-to-color bleed. On non-porous media, there is no penetration of the ink into the media, i.e. the colorant remains on the surface of the media, and image quality defects resulting from wetting and ink migration across the nonporous surface are more difficult to control, especially at high printing speeds.

In addition to printing the ink, a clear, colourless optimizer or fixing fluid composition is often printed onto a non-porous print substrate, either as a pre-treating composition printed before the ink, or as an overcoat composition printed after the ink. These optimizer or fixing fluids act to immobilize the colorant particles present in the ink on the surface of the print substrate, so that the printed image is sharp, with as little coalescence or bleed as possible.

BRIEF DESCRIPTION OF THE FIGURE

FIG. 1 shows the amounts of fixing fluid compositions of the present disclosure (as a volume percentage basis of the tested latex ink) needed for acceptable levels of bleed on a non-porous substrate.

DETAILED DESCRIPTION

Before particular embodiments of the present system and method are disclosed and described, it is to be understood that the present system and method are not limited to the particular process and materials disclosed herein as such may vary to some degree. It is also to be understood that the terminology used herein is used for the purpose of describing particular embodiments only and is not intended to be limiting, as the scope of the present system and method will be defined only by the appended claims and equivalents thereof.

In the present specification, and in the appended claims, the following terminology will be used:

The singular forms "a," "an," and "the" include plural referents unless the context clearly dictates otherwise. Thus, for example, reference to "a pigment" includes reference to one or more of such materials.

The terms "about" and "approximately," when referring to a numerical value or range is intended to encompass the values resulting from experimental error that can occur when taking measurements.

Unless otherwise stated, references herein to "wt %" of a component are to the weight of that component as a percentage of the whole composition comprising that component. For example, references herein to "wt %" of, for example a solid material such as a pigment or latex polymer dispersed in a liquid composition are to the weight percentage of those solids in the composition, and not to the amount of that solid as a percentage of the total non-volatile solids of the composition.

As used herein, the term "particle size" is a reference to the mean particle size by volume, as measured using laser diffraction techniques using diffractometers such as the Malvern Mastersizer, or Microtrac or Nanotrac diffractometers.

As used herein, references to "fixing fluid", "optimizer fluid", "pre-treat fluid", "post-treat fluid", "overcoat fluid", or to compositions with the same names, are to liquid compositions that are intended to be printed before, simultaneously with, or after an inkjet ink composition has been printed onto a media substrate to help adhere the printed colorant to the substrate so as to reduce bleed. Such fluids and compositions are generally known in the art, and are known generally to be free of colorant (i.e. are colourless), but contain "crashing agents" to promote colorant aggregation and thereby reduce bleed.

As used herein, "ink vehicle" or "liquid vehicle" is defined to include liquid compositions that can be used to carry components such as pigments, to a substrate. Liquid vehicles are well known in the art, and a wide variety of liquid vehicle components may be used in accordance with examples of the present ink set and method. Such liquid vehicles may include a mixture of a variety of different agents, including without limitation, surfactants, co-solvents, buffers, biocides, viscosity modifiers, sequestering agents, stabilizing agents, and water. Though not liquid per se, the liquid vehicle can also carry other solids, such as polymers, UV curable materials, plasticizers, salts, etc.

As used herein "pigment" refers to color imparting particulates that may be suspended in an ink vehicle. Pigments that can be used include self-dispersed pigments and non self-dispersed dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a non self-dispersed pigment that utilizes a separate and unattached dispersing agent (which can be a polymer, an oligomer, or a surfactant, for example) in the liquid vehicle or physically coated on the surface of the pigment. The dispersing agent can be non-ionic or ionic, anionic or cationic. If the dispersing agent is anionic, processing carboxyl groups, for example, the pigment is referred to as an "anionic pigment dispersion".

As used herein, the term "set" refers to a set of inks, whether packaged or made available as part of a set, or packaged and made available separately for use with other members of the set.

The terms "low-porous media" or "non-porous media" each refer to print media which has a Bristow Test of less than 2 ml/m$^2$ at a contact time of less than 0.5 s. The Bristow Test is known in the art and is summarized below. A test specimen of defined dimensions is affixed to the smooth rim of a wheel free to rotate at a defined constant speed in contact with a stationary test fluid applicator pressing against the test specimen with a defined pressure. The test fluid applicator consists of a test solution storage compartment affixed above a 1 by 15-mm test fluid delivery slot, the slot being positioned so that the long dimension is perpendicular to the direction of rotation of the rim of the wheel, and parallel to the wheel axis. A defined quantity of test fluid is placed through the fluid reservoir, onto the fluid delivery slot. With the wheel with the test specimen affixed rotating at constant speed, the test solution applicator is brought into contact with the rotating test specimen and held in place under defined pressure. The test fluid is transferred from the test solution applicator onto the test specimen in a band whose width, controlled by the applicator slot width is approximately 15 mm, and whose length is function of the absorptive characteristics of the test fluid interaction with the test specimen under the defined test conditions. The amount of liquid absorbed per unit area of test specimen is calculated from the volume of test fluid originally placed in the applicator, and the average width and length of the band created on the test specimen by the transferred test fluid. The time available for the liquid absorption is calculated from the volume of test fluid originally placed in the applicator and applicator geometry.

As used herein, "latex," "latex polymer," "latex particulates" or "latex particles" refer to the polymeric masses synthesized from individual monomers, which can be dispersed in a liquid vehicle forming a latex dispersion. The term "latex" generally refers to liquid and polymeric particles that are dispersed within the liquid. However, when a latex (i.e. a latex dispersion including latex polymer particles) is formulated within an ink, the liquid becomes part of the liquid vehicle of the ink, and thus, latex polymer can be described based on the latex particle or latex polymer solids that remain dispersed in the liquid vehicle. A latex may be a liquid suspension comprising a liquid (such as water and/or other liquids) and polymeric particulates from 20 nm to 500 nm (preferably from 100 nm to 300 nm) in size. Typically, the polymeric particulate can be present in the liquid at from 0.5 wt % to 35 wt %. Such polymeric particulates can comprise a plurality of monomers that are typically randomly polymerized, and can also be cross-linked. Additionally, in one embodiment, the latex component can have a glass transition temperature from about −20° C. to +100° C.

As used herein, "co-polymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

The term "monomer emulsion" refers to an organic monomer or monomer mix that is emulsified in an aqueous or water phase. Once the organic monomer or monomer mix is polymerized, a latex polymer dispersion is formed.

The term "latex polymer dispersion" or "latex dispersion" includes both latex particulates as well as the aqueous medium in which the latex particulates are dispersed. More specifically, a latex dispersion is a liquid suspension comprising a liquid (such as water and/or other liquids) and polymeric particulates from 20 nm to 500 nm (preferably from 100 nm to 300 nm) in size, and having a weight average molecular weight from about 10,000 Mw to 2,000,000 Mw (preferably from about 40,000 Mw to 100,000 Mw). Such polymeric particulates can comprise a plurality of monomers that are typically randomly polymerized, and can also be crosslinked. When crosslinked, the molecular weight can be even higher than that cited above.

The term "(meth)acrylate" is well understood in the art to refer to both acrylates and methacrylates. For example, "cyclohexyl (meth)acrylate" refers to cyclohexyl acrylate and/or cyclohexyl methacrylate. Likewise, the term "cycloaliphatic (meth)acrylate monomer" denotes a cycloaliphatic acrylate monomer and/or a cycloaliphatic methacrylate monomer; and the term "aromatic(meth)acrylate monomer" denotes an aromatic acrylate monomer and/or an aromatic methacrylate monomer.

The term "(meth)acrylamide" is well understood in the art to refer to both acrylamides and meth acrylamides. For example, the term "cycloaliphatic (meth)acrylamide monomer" denotes a cycloaliphatic acrylamide monomer and/or a cycloaliphatic methacrylamide monomer, and the term "aromatic(meth)acrylamide monomer" denotes an aromatic acrylamide monomer and/or an aromatic methacrylamide monomer.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to approximately 20 wt % should be interpreted to include not only the explicitly recited concentration limits of 1 wt % to approximately 20 wt %, but also to include individual concentrations such as 2 wt %, 3 wt %, 4 wt %, and sub-ranges such as 5 wt % to 10 wt %, 10 wt % to 20 wt %, etc.

In the following description, for purposes of explanation, numerous specific details are set forth in order to provide a thorough understanding of the present ink set and method for inkjet printing. It will be apparent, however, to one skilled in the art, that the present method may be practiced without these specific details. Reference in the specification to "one example" or "an example" means that a particular feature, structure, or characteristic described in connection with the example is included in at least one example. The appearance of the phrase "in one example" in various places in the specification are not necessarily all referring to the same example.

Unless otherwise stated, any feature described herein can be combined with any aspect or any other feature described herein.

The present inventors have found difficulties with reducing bleed of images printed on substrates, in particular non-porous media substrates, with latex inkjet inks, as well as controlling coalescence on these same substrates.

Therefore, the present inventors have sought to provide fixing fluid compositions, for use in methods of inkjet printing, which can be used on non-porous substrates. The present inventors have found that fixing fluid compositions in accordance with the present disclosure are particularly effective at reducing bleed and coalescence of latex-based inks printed onto substrates, including non-porous and rigid substrates.

In an aspect there is provided a method of inkjet printing, comprising: printing onto a substrate an inkjet fixing composition comprising a cationic polymer in an amount of less than 5 wt. %; an organic acid in an amount of 3 wt. % or less; and a liquid vehicle; and printing a latex-containing inkjet ink composition onto the substrate.

In a further aspect there is provided an inkjet fixing composition, comprising: a cationic polymer in an amount of less than 5 wt. %; an organic acid in an amount of 3 wt. % or less; and a liquid vehicle.

In a further aspect there is provided an ink set comprising: a printhead containing a latex-containing ink composition; and a further printhead containing an inkjet fixing composition comprising a cationic polymer in an amount of less than 5 wt. %; an organic acid in an amount of 3 wt. %; or less and a liquid vehicle.

Fixing Fluid Composition

In one example, an inkjet fixing fluid composition comprises: a cationic polymer in an amount of less than 5 wt. %; an organic acid in an amount of 3 wt. % or less; and a liquid vehicle. In one example, the inkjet fixing fluid composition is substantially free of colorant. By substantially free of colorant, it will be understood that the composition appears colourless to the unaided eye under normal light and is thus distinguished from an inkjet ink composition comprising colorant such as cyan, magenta, yellow or black. In one example, the composition is an aqueous solution, substantially free of any dispersed solids.

Cationic Polymer

In one example, the inkjet fluid composition comprises a water soluble cationic polymer. The water soluble cationic polymer may be present in an amount of less than about 5 wt. %. In one example, the inkjet fixing composition comprises a cationic polymer present in an amount of less than about 4 wt. %, for example less than about 3 wt %, for example less than about 2.5 wt %, for example less than about 2.4 wt %, for example less than about 2.3 wt %, for example less than about 2.2 wt %, for example less than about 2.1 wt %, for example less than about 2 wt %, for example less than about 1.5 wt %, for example about 1 wt %, based on the total weight of the composition.

In one example, the inkjet fixing composition comprises a cationic polymer present in an amount of greater than about 1 wt. %. In one example, the inkjet fixing composition comprises a cationic polymer present in an amount of greater than about 1.5 wt. %, for example greater than about 2 wt %, for example greater than about 2.1 wt %, for example greater than about 2.2 wt %, for example greater than about 2.3 wt %, for example greater than about 2.4 wt %, for example greater than about 2.5 wt %, for example greater than about 3 wt %, for example greater than about 4 wt %, for example about 5 wt %, based on the total weight of the composition.

Many different types of cationic polymer are known in the art to be suitable for use in fixing fluid compositions. In one example, the cationic polymer comprises one or more of a quaternary amine, a polyamine, such as a polyethyleneimine ("PEI"), a polyguanidine cationic polymer, a water-soluble cationic dendrimer, a water-dispersed alkoxylated form of polyethyleneimine, a water-dispersed alkoxylated form of a dendrimer, a water-soluble alkoxylated form of a dendrimer, polyallylamine, poly diallyl dimethyl ammonium chloride, or a polyvinyl pyrrolidone. Suitable polyamines include those derived from epichlorohydrin and dimethyl amine, for example copolymers of epichlorohydrin and dimethyl amine. Suitable polyguanidine cationic polymers may include, but are not limited to, hexamethylene guanide ("HMG"), a polymer of hexamethylene biguanide ("HMB"), and a copolymer of HMB and HMG. PHMB is available from Avecia™ Ltd. (Manchester, England). Suitable cationic polymers may include, but are not limited to, those obtainable from SNF Group such as Floquat™ 2350, a linear polyamine, as well as structured polyamines such as Floquat™ 2999, 2949, 3249, 2370 and 2273.

Organic Acid

In one example, the inkjet fixing composition comprises an organic acid present in an amount of about 3 wt. % or less. In one example, the inkjet fixing composition comprises an organic acid present in an amount of about 2.5 wt % or less, for example in an amount of about 2 wt % or less, for example in an amount of about 1.5 wt % or less, for example in an amount of about 1 wt % or less, for example in an amount of about 0.9 wt % or less, for example in an amount of about 0.8 wt % or less, for example in an amount of about 0.7 wt % or less, for example in an amount of about 0.6 wt % or less, for example in an amount of about 0.5 wt %.

In one example, the inkjet fixing composition comprises an organic acid present in an amount of greater than about 0.5 wt. %. In one example, the inkjet fixing composition comprises an organic acid present in an amount of greater than about 0.6 wt %, for example in an amount of greater than about 0.7 wt %, for example in an amount of greater than about 0.8 wt %, for example in an amount of greater than about 0.9 wt %, for example in an amount of greater than about 1 wt %, for example in an amount of greater than about 1.5 wt %, for example in an amount of greater than about 2 wt %, for example in an amount of greater than about 2.5 wt %, for example in an amount of greater than about 3 wt %.

In one example, the organic acid comprises one or more of succinic acid, citric acid, glycolic acid, nitric acid, hydrochloric acid, phosphoric acid, sulfuric acid, polyacrylic acid, acetic acid, malonic acid, maleic acid, ascorbic acid, glutaric acid, fumaric acid, tartaric acid, lactic acid, nitrous acid, boric acid, carbonic acid, carboxylic acids such as formic acid, chloroacetic acid, dichloroacetic acid, trichloroacetic acid, fluoroacetic acid, trimethylacetic acid, methoxyacetic acid, mercaptoacetic acid, propionic acid, butyric acid, valeric acid, caproic acid, caprylic acid, capric acid, lauric acid, myristic acid, palmitic acid, stearic acid, oleic acid, rinolic acid, rinoleic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, adipic acid, phthalic acid, isophthalic acid, terephthalic acid, salicylic acid, p-hydrobenzoic acid, anthranilic acid, m-aminobenzoic acid, p-aminobenzoic acid, benzenesulfonic acid, methylbenzenesulfonic acid, ethylbenzenesulfonic acid, dodecylbenzenesulfonic acid, 5-sulfosalicylic acid, 1-sulfonaphthalene, hexanesulfonic acid, octanesulfonic acid, dodecanesulfonic acid, amino acids such as glycine, alanine, valine, alpha-aminobutyric acid, alpha-aminobutryic acid, alpha-alanine, taurine, serine, alpha-amino-n-caproic acid, leucine, norleucine, phenylalanine, and combinations thereof.

In some examples, the organic acid is included in the fixing fluid composition as the free acid. By free acid, it will be understood that the counter ion to the carboxyl group of the acid is a proton, and not any other cationic species, such as an ammonium ion. Ammonium salts of the organic acid are not desirable in thermal inkjet printing as these can negate the effects of anionic dispersants that may be present in the thermal inkjet composition.

In one example, the organic acid comprises one or more of succinic acid and citric acid. In one example, the organic acid comprises succinic acid in an amount of less than about 1 wt %, for example less than about 0.9 wt %, for example less than about 0.8 wt %, for example about 0.75 wt % of the total weight of the fixing fluid composition.

In one example, the organic acid comprises succinic acid in an amount of greater than about 0.75 wt %, for example greater than about 0.8 wt %, for example greater than about 0.9 wt %, for example about 1 wt % of the total weight of the fixing fluid composition.

In one example, the organic acid comprises citric acid in an amount of less than about 3 wt %, for example less than about 2.5 wt %, for example less than about 2.4 wt %, for example less than about 2.3 wt %, for example less than about 2.2 wt %, for example less than about 2.1 wt %, for example less than about 2 wt %, for example less than about 1.9 wt %, for example less than about 1.8 wt %, for example less than about 1.7 wt %, for example less than about 1.6 wt %, for example less than about 1.5 wt %, for example less than about 1.4 wt %, for example less than about 1.3 wt %, for example less than about 1.2 wt %, for example less than about 1.1 wt %, for example less than about 1 wt %, for example less than about 0.9 wt %, for example less than about 0.8 wt %, for example less than about 0.7 wt %, for example less than about 0.6 wt %, for example about 0.5 wt % of the total weight of the fixing fluid composition.

In one example, the organic acid comprises citric acid in an amount of greater than about 0.5 wt %, for example greater than about 0.6 wt %, for example greater than about 0.7 wt %, for example greater than about 0.8 wt %, for example greater than about 0.9 wt %, for example greater than about 1 wt %, for example greater than about 1.1 wt %, for example greater than about 1.2 wt %, for example greater than about 1.3 wt %, for example greater than about 1.4 wt %, for example greater than about 1.5 wt %, for example greater than about 1.6 wt %, for example greater than about 1.7 wt %, for example greater than about 1.8 wt %, for example greater than about 1.9 wt %, for example greater than about 2 wt %, for example greater than about 2.1 wt %, for example greater than about 2.2 wt %, for example greater than about 2.3 wt %, for example greater than about 2.4 wt %, for example greater than about 2.5 wt %, for example about 3 wt % of the total weight of the fixing fluid composition.

Liquid Vehicle

In one example, the inkjet fixing composition comprises a liquid vehicle. The liquid vehicle may be an aqueous liquid vehicle, i.e. it comprises water.

In some examples, the liquid vehicle comprises a solvent. In some examples, the solvent is selected from an aliphatic alcohol, for example a primary aliphatic alcohol, a secondary aliphatic alcohol or a tertiary aliphatic alcohol. The aliphatic alcohol may be a diol. In some examples, the solvent is an aliphatic alcohol containing 10 carbons or less, for example 8 carbons or less or 6 carbons or less. In some examples, the solvent is an aliphatic alcohol being a diol containing 10 carbons or less, for example 8 carbons or less or 6 carbons or less.

In some examples, the solvent is selected from the group comprising 1,2-propanediol, 1,2-butanediol, ethylene glycol, 2-methyl-2,4-pentanediol, 1,3-butanediol, 2-methyl-1,3-propanediol and 1,3-propanediol. In some examples the solvent is selected from the group comprising 1,2-propanediol, 1,2-butanediol, ethylene glycol, 2-methyl-2,4-pentanediol, and 1,3-butanediol. In some examples the solvent is selected from the group consisting of 1,2-propanediol, 1,2-butanediol, ethylene glycol, 2-methyl-2,4-pentanediol, 1,3-butanediol, 2-methyl-1,3-propanediol and 1,3-propanediol. In some examples the solvent is selected from the group consisting of 1,2-propanediol, 1,2-butanediol, ethylene glycol, 2-methyl-2,4-pentanediol, and 1,3-butanediol. In some examples the solvent is 1,2-butanediol.

In some examples, the fixing fluid composition comprises at least about 2 wt. % of the solvent by total weight of the composition, for example at least about 10 wt. %, or at least about 15 wt. % by total weight of the composition.

In some examples, the fixing fluid composition comprises less than about 40 wt. % of the solvent by total weight of the composition, for example less than about 30 wt. %, or less than about 20 wt. % by total weight of the composition.

In some examples, the fixing fluid composition comprises the solvent in an amount of from about 2 wt. % to about 40 wt. % by total weight of the composition, for example from about 5 wt. % to about 30 wt. %, about 7 wt. % to about 20 wt. %, or from about 8 wt. % to about 15 wt. % by total weight of the composition.

In some examples, the fixing fluid composition has a pH of less than about 7, for example a pH of less than about 6, for example a pH of less than about 5, for example a pH of less than about 4, for example a pH of less than about 3, for example a pH of less than about 2, for example a pH of about 1.5.

In some examples, the fixing fluid composition has a pH of greater than about 1.5, for example a pH of greater than about 2, for example a pH of greater than about 3, for example a pH of greater than about 4, for example a pH of greater than about 5, for example a pH of greater than about 6, for example a pH of about 7.

Any number of commonly known buffers may be used to establish a desired pH level in the inkjet ink system. In one example, the fixing fluid composition comprises a Tris-based buffer. In one example, the pH of the fixing fluid composition is adjusted using aqueous potassium hydroxide.

The fixing fluid composition may also include one or more surfactants. The surfactant may be present to lower surface tension. As an example, the ink may include non-ionic, cationic, and/or anionic surfactants, which may be present in an amount ranging from about 0.01 to 5 wt % based on the total concentration of the fixing fluid composition. In some examples, the surfactant may be a non-ionic surfactant, such as a silicone-free alkoxylated alcohol surfactant such as, for example, Tergitol® 15-S-7 (Dow Chemical™), present in an amount of about 0.1 to 1.5 wt % of the total ink composition, or, in another example, present in an amount of about 0.95 wt %. Other suitable surfactants include non-ionic fluorosurfactants, including those available from DuPont™ such as Capstone) FS-35, FS-34, FS-65 and the Zonyl® range of fluorosurfactants such as FSO-100.

The fixing fluid composition may also include any number of anti-microbial agents, sequestering agents, and viscosity modifiers. Additionally, various anti-microbial agents can be used to inhibit growth of undesirable microorganisms. Suitable antimicrobial agents may include biocides and fungicides, which are routinely used in ink formulations and fixer formulations. Several examples of suitable antimicrobial agents may include, but are not limited to, benzoate salts, sorbate salts, commercial products such as NUOSEPT™ (ISP), UCARCIDE™ (Dow Chemical™), VANCIDE® (RT Vanderbilt™ Co.), and PROXEL™ (Avecia) and other known biocides. Examples of suitable fungicides may include Kordek™ LX (Rohm and Haas™) and Bioban™ CS-1246 (Dow Chemical™). Typically, such anti-microbial agents may be present in a range of about 0.05 to 2 wt %. In an example, the fixing fluid composition may include a total amount of antimicrobial agents that ranges from about 0.1 wt % to about 0.25 wt %.

Sequestering agents, such as EDTA (ethylene diamine tetra acetic acid), may be included to eliminate the deleterious effects of heavy metal impurities. From 0 to 2 wt %, for example, can be used.

As mentioned above, the balance of the present inkjet ink composition includes water.

There is also provided herein a method of preparing an inkjet fixing composition comprising mixing a cationic polymer in an amount of less than 5 wt. %; an organic acid in an amount of 3 wt. % or less; and a liquid vehicle. In one example, the cationic polymer, organic acid and liquid vehicle are mixed at a temperature sufficient to ensure formation of a homogenous composition.

Method of Inkjet Printing

In some examples, a method of inkjet printing is described, comprising: printing onto a substrate an inkjet fixing composition comprising a cationic polymer in an amount of less than 5 wt. %; an organic acid in an amount of 3 wt. % or less; and a liquid vehicle; and printing a latex-containing inkjet ink composition onto the substrate.

In one example, the inkjet fixing composition is as described herein. In one example, the substrate is a non-porous substrate comprises one or more of vinyl, polycarbonate, polytetrafluoroethylene (PTFE), polyester, acrylic, polyethylene, polypropylene, polystyrene, cellulose, a metal, a ceramic, or a glass. In one example, the non-porous substrate comprises polyethylene or polypropylene. In one example, the substrate is a porous substrate, for example paper or a polyester textile. The nature of the substrate will depend on the end application of the printed substrate, i.e. the user requirements.

The inkjet fixing composition is suited for use as a pre-treatment undercoat or a post-treatment overcoat to the printed ink composition. In one example, the inkjet fixing composition is printed as a pre-treatment onto the non-porous substrate before the latex-containing ink composition is printed. In one example, the inkjet fixing composition is printed as an overcoat onto the non-porous substrate after the latex-containing ink composition has been printed.

In one example, the amount of inkjet fixing composition relative to inkjet ink composition printed onto the substrate may be less than about 25%, expressed as a volume percentage. In other words, a ratio of 25% is equivalent to 4 volume parts ink to every one volume part of fixing composition. In one example, the amount of inkjet fixing composition relative to inkjet ink composition printed onto the substrate may be less than 20%, for example less than about 18%, for example less than about 16%, for example less than about 14%, for example less than about 12%, for example less than about 10%, for example less than about 8%, for example less than about 6%, for example less than about 5%, expressed as a volume percentage.

In one example, the amount of inkjet fixing composition relative to inkjet ink composition printed onto the substrate may be greater than about 5%, expressed as a volume percentage. In one example, the amount of inkjet fixing composition relative to inkjet ink composition printed onto the substrate may be greater than 6%, for example greater than about 8%, for example greater than about 10%, for example greater than about 12%, for example greater than about 14%, for example greater than about 16%, for example greater than about 18%, for example greater than about 20%, for example greater than about 25%, expressed as a volume percentage.

The method of inkjet printing comprises printing a latex-containing ink composition comprising a latex polymer.

Latex polymers can be prepared using any of a number of methods known in the art, including but not limited to emulsion polymerization techniques where co-monomers are dispersed and polymerized in a discontinuous phase of an emulsion. The latexes can also be dispersions of polymer prepared by other techniques known to those in the art.

The monomers used in the latexes can be vinyl monomers. In some examples, the monomers from which the latex polymer is formed are selected from vinyl monomers, acrylate monomers, methacrylate monomers, styrene monomers, ethylene, vinyl chloride, vinylidene chloride, maleate esters, fumarate esters, itaconate esters and combinations thereof. In some examples, monomers from which the latex polymer is formed may comprise ethyl acrylate; ethyl methacrylate; benzyl acrylate; benzyl methacrylate; propyl acrylate; propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl acrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropyhiethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; iso-butyl acrylate; iso-butyl methacrylate; 2-ethylhexyl acrylate; 2-ethylhexyl methacrylate; iso-octyl acrylate; iso-octyl methacrylate; and combinations thereof.

In some examples, the latex polymer is formed from monomers selected from styrenes, C1 to C8 alkyl methacrylates, C1 to C8 alkyl acrylates, ethylene glycol methacrylates and dimethacrylates, methacrylic acids, acrylic acids, and combinations thereof. Examples of latex polymers that can be used include those prepared using a monomer emulsion of methyl methacrylate, butyl acrylate, cyclohexyl methacrylate and methacrylic acid, which are copolymerized to form the latex.

In some examples, the monomers from which the latex polymer is formed include acid monomers, such as (meth) acrylic acid monomers. Acidic monomers that can be polymerized in forming latexes include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

In some examples, the latex polymer comprises a (meth) acrylate polymer or copolymer. In some examples, the latex polymer comprises a (meth)acrylate copolymer. For example, the latex polymer may comprise a copolymer of a (meth)acrylate monomer and another vinyl monomer, for example another vinyl monomer selected from styrenes, C1 to C8 alkyl methacrylates, C1 to C8 alkyl acrylates, ethylene glycol methacrylates and dimethacrylates, methacrylic acids, acrylic acids, and combinations thereof.

In some examples, the latex polymer comprises a (meth) acrylate polymer being a polymer comprising (meth)acrylate monomers or a (meth)acrylate copolymer being a copolymer comprising (meth)acrylate monomers. In some examples, the latex polymer comprises a (meth)acrylate copolymer comprising (meth)acrylate monomers. In some examples the (meth)acrylate copolymer comprises (meth) acrylate monomers and vinyl monomers selected from styrenes, C1 to C8 alkyl methacrylates, C1 to C8 alkyl acrylates, ethylene glycol methacrylates and dimethacrylates, methacrylic acids, acrylic acids, and combinations thereof.

In some examples, the (meth)acrylate monomers are selected from aliphatic (meth)acrylate monomers, aromatic (meth)acrylate monomers and combinations thereof.

In some examples, aliphatic (meth)acrylate monomers comprise linear aliphatic (meth)acrylate monomers and/or cycloaliphatic (meth)acrylate monomers.

In some examples, linear (meth)acrylate monomers comprise alkyl (meth)acrylate monomers (for example C1 to C8 alkyl (meth)acrylate monomers). In some examples, the linear (meth)acrylate monomers comprise alkyl methacrylate monomers (e.g. C1 to C8 alkyl methacrylate monomers). In some examples, the linear (meth)acrylate monomers comprise alkyl methacrylate monomers (e.g. C1 to C8 alkyl methacrylate monomers) and alkyl acrylate monomers (C1 to C8 alkyl acrylate monomers).

In some examples, the latex polymer comprises a copolymer comprising alkyl (meth)acrylate (e.g. C1 to C8 alkyl (meth)acrylate monomers) and styrene monomers. In some examples, the latex polymer comprises a copolymer comprising alkyl (meth)acrylate (e.g. C1 to C8 alkyl (meth) acrylate monomers), cyclohexyl methacrylate monomers and (meth)acrylic acid monomers.

In some examples, the latex inkjet ink composition comprises up to about 35 wt. % latex polymer by total weight of the inkjet ink composition. In some examples, the latex inkjet ink composition comprises up to about 30 wt. % latex polymer by total weight of the inkjet ink composition. In some examples, the latex inkjet ink composition comprises up to about 25 wt. % latex polymer by total weight of the inkjet ink composition.

In some examples, the latex inkjet ink composition comprises at least about 1 wt. % latex polymer by total weight of the inkjet ink composition. In some examples, the latex inkjet ink composition comprises at least about 2 wt % latex polymer by total weight of the inkjet ink composition. In some examples, the latex inkjet ink composition comprises at least about 5 wt. % latex polymer by total weight of the inkjet ink composition. In some examples, the latex inkjet ink composition comprises at least about 10 wt. % latex polymer by total weight of the inkjet ink composition.

In some examples, the latex inkjet ink composition comprise from about 1 wt. % to about 35 wt. % latex polymer by total weight of the inkjet ink composition. In some examples, the latex inkjet ink composition comprise from about 2 wt. % to about 30 wt. % latex polymer by total weight of the inkjet ink composition. In some examples, the latex inkjet ink composition comprise from about 5 wt. % to about 25 wt. % latex polymer by total weight of the inkjet ink composition.

In some examples, the inkjet ink composition comprises a pigment. For example, the inkjet ink composition may comprise a latex polymer, a pigment; and an ink vehicle.

The term "pigment" can include particulate dispersible colorants that can be suspended or dispersed in a liquid vehicle in accordance with embodiments of the present invention. Irrespective of other pigments that may be present, at least one pigment type that must be present is a polymer-attached pigment. "Polymer-attached pigments" include pigments having a polymer covalently attached to the surface of the pigment, a polymer adsorbed or grafted onto the surface of the pigment, or a pigment at least partially encapsulated by a polymer. The pigment itself can be a self-dispersed pigment or a non self-dispersed pigment. Self-dispersed pigments include those that have been chemically surface modified with a charge or a polymeric grouping. This chemical modification aids the pigment in becoming and/or substantially remaining dispersed in a liquid vehicle. When a polymeric grouping provides the surface modification, then it is considered to be a polymer-attached pigment without further modification, though further modification is not precluded. The pigment used to form the polymer-attached pigment can also be a non self-dispersed pigment that utilizes a separate and unattached dispersing agent (which can be a polymer, an oligomer, or a surfactant, for example) in the liquid vehicle or physically coated on the surface of the pigment.

The pigment may include black pigments, white pigments, cyan pigments, magenta pigments, yellow pigments, or the like. Suitable inorganic pigments include, for example, carbon black. However, other inorganic pigments may be suitable such as titanium oxide, cobalt blue (CoO—$Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, and the like. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138, Pigment Yellow 155, Pigment Yellow 83, and Pigment Yellow 213. Such pigments are commercially available in either powder or press cake form from a number of sources including, BASF™ Corporation, Engelhard™ Corporation and Sun Chemical™ Corporation.

Examples of black pigments that can be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot™ Corporation, Columbian Chemicals Company, Degussa AG™, and E.I. DuPont™ de Nemours and Company. Suitable carbon black pigments include, without limitation, Cabot pigments such as MONARCH™ 1400, MONARCH™ 1300, MONARCH™ 1100, MONARCH™ 1000, MONARCH™ 900, MONARCH™ 880, MONARCH™ 800, MONARCH™ 700, CAB-O-JET™ 200, CAB-O-JET™ 300, REGAL, BLACK PEARLS™, ELFTEX™, MOGUL™, and VULCAN™ pigments; Columbian pigments such as RAVEN™ 7000, RAVEN™ 5750, RAVEN™ 5250, RAVEN™ 5000, and RAVEN™ 3500; Degussa pigments such as Color Black FW 200, RAVEN™ FW 2, RAVEN™ FW 2V, RAVEN™ FW 1, RAVEN™ FW 18, RAVEN™ S160, RAVEN™ FW S170, Special Black™ 6, Special Black™ 5, Special Black™ 4A, Special Black™ 4, PRINTEX™ U, PRINTEX™ 140U, PRINTEX™ V, and PRINTEX™ 140V; and TIPURE™ R-101 available from DuPont™. The above list of pigments includes unmodified pigment particulates, small molecule attached pigment particulates, and polymer-dispersed pigment particulates.

Similarly, a wide variety of colored pigments can be used with the inkjet ink composition, therefore the following listing is not intended to be limiting. For example, colored pigments can be blue, brown, cyan, green, white, violet, magenta, red, orange, yellow, as well as mixtures thereof. The following color dispersions are available from Cabot™ Corp. CABO-JET™ 250C, CABO-JET™ 260M, and CABO-JET™ 270Y. The following color pigments are available from BASF™ Corp.: PALIOGEN™ Orange, PALIOGEN™ Orange 3040, PALIOGEN™ Blue L 6470, PALIOGEN™ Violet 5100, PALIOGEN™ Violet 5890, PALIOGEN™ Yellow 1520, PALIOGEN™ Yellow 1560, PALIOGEN™ Red 3871K, PALIOGEN™ Red 3340, HELIOGEN™ Blue L 6901F, HELIOGEN™ Blue NBD 7010, HELIOGEN™ Blue K 7090, HELIOGEN™ Blue L 7101F, HELIOGEN™ Blue L6900, L7020, HELIOGEN™ Blue D6840, HELIOGEN™ Blue D7080, HELIOGEN™ Green L8730, HELIOGEN™ Green K 8683, and HELIOGEN™ Green L 9140. The following pigments are available from Ciba-Geigy Corp.: CHROMOPHTAL™ Yellow 3G, CHROMOPHTAL™ Yellow GR, CHROMOPHTAL™ Yellow 8G, IGRAZIN™ Yellow 5GT, IGRALITE™ Rubine 4BL, IGRALITE™ Blue BCA, MONASTRAL™ Magenta, MONASTRAL™ Scarlet, MONASTRAL™ Violet R, MONASTRAL™ Red B, and MONASTRAL™ Violet Maroon B. The following pigments are available from Heubach Group™: DALAMAR™ Yellow YT-858-D and HEUCOPHTHAL™ Blue G XBT-583D. The following pigments are available from Hoechst Specialty Chemicals™: Permanent Yellow GR, Permanent Yellow G, Permanent Yellow DHG, Permanent Yellow NCG-71, Permanent Yellow GG, Hansa Yellow RA, Hansa Brilliant Yellow 5GX-O2, Hansa Yellow-X, NOVOPERM™ Yellow HR, NOVOPERM™ Yellow FGL, Hansa Brilliant Yellow 10GX, Permanent Yellow G3R-01, HOSTAPERM™ Yellow H4G, HOSTAPERM™ Yellow H3G, HOSTAPERM™ Orange GR, HOSTAPERM™ Scarlet GO, HOSTAPERM™ Pink E, Permanent Rubine F6B, and the HOSTAFINE™ series. The following pigments are available from Mobay Corp.: QUINDO™ Magenta, INDOFAST™ Brilliant Scarlet, QUINDO™ Red R6700, QUINDO™ Red R6713, and INDOFAST™ Violet. The following pigments are available from Sun Chemical Corp.: L74-1357 Yellow, L75-1331 Yellow, and L75-2577 Yellow. Other examples of pigments can include Normandy Magenta RD-2400, Permanent Violet VT2645, Argyle Green XP-111-S, Brilliant Green Toner GR 0991, Sudan Blue OS, PV Fast Blue B2GO1, Sudan III, Sudan II, Sudan IV, Sudan Orange G, Sudan Orange 220, Ortho Orange OR 2673, Lithol Fast Yellow 0991 K, Paliotol Yellow 1840, Lumogen Yellow D0790, Suco-Gelb L1250, Suco-Yellow D1355, Fanal Pink D4830, Cinquasia Magenta, Uthol Scarlet D3700, Toluidine Red, Scarlet for Thermoplast NSD PS PA, E. D. Toluidine Red, Lithol Rubine Toner, Lithol Scarlet 4440, Bon Red C, Royal Brilliant Red RD-8192, Oracet Pink RF, Lithol Fast Scarlet L4300, and white TIPURE R-101. These pigments are available from commercial sources such as Hoechst Celanese Corporation™, Paul Uhlich, BASF, American Hoechst™, Ciba-Geigy™, Aldrich™, DuPont™, Ugine Kuhlman of Canada™, Dominion Color Company™, Magruder™, and Matheson™. Examples of other suitable colored pigments are described in the Colour Index, 3rd edition (The Society of Dyers and Colourists, 1982).

In some examples, the inkjet ink composition comprises an ink vehicle. In some examples, the ink vehicle comprises water, i.e. is an aqueous ink vehicle.

In some examples, the ink vehicle may include a variety of different agents, including without limitation, surfactants, co-solvents, buffers, biocides, viscosity modifiers, sequestering agents, stabilizing agents, and water.

In one example, the ink vehicle includes water as the base solvent and so is termed an aqueous ink vehicle.

Co-Solvent

In one example, the ink vehicle also includes one or more co-solvents. Classes of co-solvents that can be used can include organic co-solvents including aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

In one example, the ink vehicle includes one or more aliphatic alcohols as co-solvents in an amount of at least about 4 wt % of the total weight of the ink composition, for example at least about 5 wt %, for example at least about 6 wt %, for example at least about 7 wt %, for example at least about 8 wt %, for example at least about 9 wt %, for example at least about 10 wt %, for example at least about 12 wt %, for example at least about 14 wt %, for example at least about 16 wt %, for example at least about 18 wt %, for example at least about 20 wt %, for example at least about 25 wt %, for example at least about 30 wt %, for example at least about 35 wt %, for example at least about 40 wt %.

In one example, the ink vehicle includes one or more aliphatic alcohols as co-solvents in an amount of less than about 40 wt % of the total weight of the ink composition, for example less than about 35 wt %, for example less than about 30 wt %, for example less than about 25 wt %, for example less than about 20 wt %, for example less than about 18 wt %, for example less than about 16 wt %, for example less than about 14 wt %, for example less than about 12 wt %, for example less than about 10 wt %, for example less than about 9 wt %, for example less than about 8 wt %, for example less than about 7 wt %, for example less than about 6 wt %, for example less than about 5 wt %, for example about 4 wt %.

In one example, the ink vehicle includes butanediol, for example 1,2-butanediol as co-solvent in an amount of at least 4 wt % of the total weight of the ink composition. In one example, the ink vehicle comprises butanediol, for example 1,2-butanediol, in the amounts stated in the preceding paragraphs.

In one example, the ink vehicle includes one or more glycol ethers as co-solvents. In one example, the ink vehicle includes one or more glycol ethers as co-solvents in an amount of at least about 0.05 wt % of the total weight of the ink composition, for example at least about 0.1 wt %, for example at least about 0.5 wt %, for example at least about 1 wt %, for example at least about 1.5 wt %, for example at least about 2 wt %, for example at least about 2.5 wt %, for example at least about 3 wt %, for example at least about 3.5 wt %, for example at least about 4 wt %, for example at least about 4.5 wt %, for example at least about 5 wt %.

In one example, the ink vehicle includes one or more glycol ethers as co-solvents in an amount of less than about 5 wt % of the total weight of the ink composition, for example less than about 4.5 wt %, for example less than about 4 wt %, for example less than about 3.5 wt %, for example less than about 3 wt %, for example less than about 2.5 wt %, for example less than about 2 wt %, for example less than about 1.5 wt %, for example less than about 1 wt %, for example less than about 0.5 wt %, for example less than about 0.1 wt %, for example about 0.05 wt %.

Suitable glycol ethers include ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether, tripropylene glycol methyl ether, available from Dow or Sigma-Aldrich. In one example, the ink vehicle comprises tripropylene glycol methyl ether in the amounts stated in the preceding paragraphs.

Additives

Wax

In one example, the inkjet ink composition may include a wax. Wax emulsions are commercially available from a number of vendors, for example Keim-Additec™, Lubrizol™, Michelman™, and BYK Chemie™. Wax emulsions that are useful include but are not limited to: Lubrizol™: Liquilube™ 411, Liquilube™ 405, Liquilube™ 488, Liquilube™ 443, Liquilube™ 454; Michelman: ME80825, ME48040, ME98040M1, ME61335, ME90842, ME91240, ML160; Keim-Additec: Ultralube® E-521/20, Ultralube® E-7093, Ultralube® 7095/1, Ultralube® E-8046, Ultralube® E-502V, Ultralube® E-842N: Byk: Aquacer® 2650, Aquacer® 507, Aquacer® 533, Aquacer® 515, Aquacer® 537, Aquaslip™ 671, Aquaslip™ 942.

In one example, the wax can have a melting point ranging from 60° C. to 110° C. Generally, the wax can have a particle size ranging from 50 nm to 600 nm. In one example, the wax can have a particle size ranging from 200 nm to 300 nm. Generally, the wax can be present in the ink at a concentration ranging from 0.25 wt % to 5 wt %. In one example, the wax can be present ranging from 0.5 wt % to 1.5 wt %. Additionally, the wax emulsions can be compatible with high acid acrylic dispersants and hydrocolloids. By compatible, the present waxes can be used without causing aggregation or precipitation of the dispersants/hydrocolloids particularly over extended periods of time (weeks/months at ambient temperature or days/weeks at elevated temperature such as 40° C. to 65° C.). Incompatibility can manifest itself variously by increases in wax particle size, phase separation of wax, or creaming at a faster rate than in the absence of destabilizing materials.

Surfactant

In one example, the inkjet ink composition may further comprise one or more surfactants. In one example, one or more non-ionic, cationic, and/or anionic surfactants can be present in the inkjet ink composition described, ranging from 0.01 wt % to 10 wt %. Non-limiting examples of such surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, substituted amine oxides, polyethylene oxide alkyl sulfonates, polyethylene oxide alkyl sulfates, polyethylene oxide alkyl phosphates, and the like, as well as fluorocarbon and silicone surfactants. In one example, the present ink-jet inks can include alkyl ethoxylate surfactants. Such surfactants can include, but are not limited to, TERGITOL® 15-S-7, TERGITOL™ 15-S-9, TERGITOL® TMN-6 90 percent, and NEODOL® 91-6. In one example, the one or more surfactants can have an HLB value ranging from about 12 to about 13.5. As used herein, "HLB" refers to hydrophile-lipophile-balance which is a measure of the balance or proportion of hydrophilic to lipophilic portions of a molecule. In another example, the one or more surfactants can each be present in the ink-jet ink at a concentration ranging from about 0.01 wt % to about 0.5 wt %.

Various other additives may be employed to enhance the properties of the inkjet ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex™, Inc.), UCARCIDE™ (Union Carbide™ Corp.), VANCIDE® (R.T. Vanderbilt™ Co.), PROXEL™ (ICI™ America), and combinations thereof.

There is also described an ink set comprising: a printhead containing a latex-containing ink composition; and a further printhead containing an inkjet fixing composition comprising a cationic polymer in an amount of less than 5 wt. %; an organic acid in an amount of 3 wt. %; or less and a liquid vehicle.

In one example, the ink set may be in the form of an inkjet printer cartridge. In one example, each printhead may comprise a reservoir containing the respective composition. In one example, the latex-containing ink composition may be as described herein. In one example, the inkjet fixing fluid composition may be as described herein. In one example, the ink set is configured to be received by an inkjet printer, and operable to jet the latex-containing ink composition and the inkjet fixing fluid composition onto a substrate, for example a non-porous substrate.

The present inventors have found that the fixing fluid compositions described herein are needed in smaller amounts than previous fixing fluids in order to provide optimal, or minimal levels of bleed with latex-containing inkjet inks such as those described herein.

EXAMPLES

The following illustrates examples of the compositions and related aspects described herein. Thus, these examples should not be considered to restrict the present disclosure, but are merely in place to teach how to make examples of compositions of the present disclosure.

A series of fixing fluid compositions as shown in Table 1 and Table 2 were formulated aimed at improving bleed and coalescence seen with latex inks on non-porous media. The pH was adjusted using aqueous potassium hydroxide.

TABLE 1

| Component | Example 1 | Example 2 | Example 3 |
|---|---|---|---|
| Cationic polymer | 2.45 wt % | 2.45 wt % | 2.45 wt % |
| Succinic acid | 0.95 wt % | 0.95 wt % | |
| Citric acid | | | 1.7 wt % |
| Non-ionic fluorosurfactant | 0.41 wt % | 0.41 wt % | 0.41 wt % |
| Secondary alcohol ethoxylate | 0.95 wt % | 0.95 wt % | 0.95 wt % |
| 1,2-butanediol | 20 wt % | 20 wt % | 20 wt % |
| pH | 2.8 | 4.0 | 1.8 |

TABLE 2

| Component | Example 4 | Example 5 | Example 6 |
|---|---|---|---|
| Cationic polymer | 2.45 wt % | 2.45 wt % | 2.45 wt % |
| Succinic acid | | | |
| Citric acid | 0.95 wt % | 1.7 wt % | |
| Non-ionic fluorosurfactant | 0.41 wt % | 0.41 wt % | 0.41 wt % |
| Secondary alcohol ethoxylate | 0.95 wt % | 0.95 wt % | 0.95 wt % |
| 1,2-butanediol | 20 wt % | 20 wt % | 20 wt % |
| pH | 4.0 | 4.0 | 4.0 |

The comparative compositions of Table 3 were also prepared:

TABLE 3

| Component | Comparative Example 1 | Comparative Example 2 | Comparative Example 3 | Comparative Example 4 |
|---|---|---|---|---|
| Cationic polymer | 0 wt % | 0 wt % | 0 wt % | 0 wt % |
| Citric acid | 3 wt % | 5 wt % | 3 wt % | 5 wt % |
| Non-ionic fluorosurfactant | 0.41 wt % | 0.41 wt % | 0.41 wt % | 0.41 wt % |
| Secondary alcohol ethoxylate | 0 wt % | 0.95 wt % | 0 wt % | 0.95 wt % |
| 1,2-butanediol | 20 wt % | 20 wt % | 20 wt % | 20 wt % |
| pH | 4.0 | 4.0 | 4.0 | 4.0 |

TABLE 4

| | Ink Labels | | | | | |
|---|---|---|---|---|---|---|
| Ingredients (%) | Black Ink | Cyan Ink | Magenta Ink | Yellow Ink | Light Magenta Ink | Light Cyan Ink |
| Pigment Load (in wt %) | 2.69% | 1.96% | 3.36% | 3.63% | 0.65% | 0.38% |
| Acrylic Latex | 10.00% | 10.00% | 10.00% | 10.00% | 10.00% | 10.00% |
| 1,2-Butanediol | 18.00% | 18.00% | 18.00% | 18.00% | 18.00% | 18.00% |
| Glycol ether | 2.00% | 2.00% | 2.00% | 2.00% | 2.00% | 2.00% |
| Phosphate ester surfactant | 0.50% | 0.50% | 0.50% | 0.50% | 0.50% | 0.50% |
| Secondary alcohol ethoxylate | 0.25% | 0.25% | 0.25% | 0.25% | 0.25% | 0.25% |
| Secondary alcohol ethoxylate | 0.25% | 0.25% | 0.25% | 0.25% | 0.25% | 0.25% |
| Non-ionic fluorosurfactant | 0.53% | 0.79% | 0.95% | 0.85% | 0.92% | 0.79% |
| Chelating agent | 0.04% | 0.04% | 0.04% | 0.04% | 0.04% | 0.04% |
| Dispersant | 0.0075% | 0.0075% | 0.0075% | 0.0075% | 0.0075% | 0.0075% |

Pigments used were: quinacridone (magenta), phthalocyanine blue (cyan), pigment yellow 155 (yellow), and pigment black 7 (Carbon black). Floquat™ FL-2350 is a quaternized polyamine derived from epichlorohydrin and dimethyl amine from SNF, Dowanal™ TPM is a glycol ether from Dow; Capstone™ FS-35 is a non-ionic fluorosurfactant from DuPont; Tergitol® 15-S-7 and TMN-6 are secondary alcohol ethoxylate non-ionic surfactants from Sigma-Aldrich; Crodafos™ N3 acid is a phosphate ester surfactant available from Croda Inc.; Trilon® M is a chelating agent from BASF and Carbosperse™ K-7028 is a dispersant from Lubrizol.

Inks were prepared according to Table 4, with the acrylic latex prepared as follows: water (40.3 g) was heated to 80° C. with mechanical agitation. At 75° C., 0.14 g, potassium persulfate dissolved in water (4% solution) was added. At 77° C., a seed of latex polymer (0.84 g on solid basis; 67 nm particle size) was added to the reactor. To this mixture was added over 300 minutes an aqueous emulsion comprised of water (8.6 g), copolymerizable surfactant Hitenol BC-10 (1.2 g), methyl methacrylate (0.6 g), cyclohexyl methacrylate (27.6 g), butyl acrylate (5.0 g) and methacrylic acid (0.26 g).

Residual monomer was reduced by typical methodology using ascorbic acid and tert-butyl hydroperoxide. After cooling the near ambient temperature, pH is adjusted to ~8 with dilute potassium hydroxide; inkjet suitable aqueous biocides are added. The resulting acrylic latex was 35.8% solids; particle size 0.23µ; viscosity <50 cps.

Each fixing fluid composition was printed using an HP Latex 360 printer using a pre-treatment onto a non-porous vinyl substrate (MPI3000 gloss from Avery Europe) followed by printing of an aqueous latex ink in accordance with Table 4 and the bleed levels assessed. The L360 printer allows different media profiles to be setup using different amounts of optimizer relative to the amount of ink printed via a setup menu available on the printer front panel. Printing temperatures were those used for self-adhesive vinyl. The print mode was an 80 passes printmode, with efficiency Mode off, 6 passes. Different levels of pre-treat (as a volume percentage of the ink to be printed) were tested, with the optimum level of each composition shown in FIG. 1. As can be seen, all Examples give acceptable levels of bleed on the non-porous substrate at relatively low levels of fixing fluid. Examples 1 to 3 are required in even lower amounts compared to Examples 4 to 6 in order to give comparable levels of acceptable bleed, meaning that less fixer composition is required per print. The compositions prepared according to the Comparative Examples gave unacceptable levels of bleed at the same levels. The present inventors have also found that fixer fluid compositions according to the Examples result in a reduction of coalescence with minimal loss of adhesion and durability performance.

While the compositions, methods and related aspects have been described with reference to certain examples, it will be appreciated that various modifications, changes, omissions, and substitutions can be made without departing from the spirit of the disclosure. It is intended, therefore, that cartridges, compositions, methods and related aspects be limited only by the scope of the following claims. Unless otherwise stated, the features of any dependent claim can be combined with the features of any of the other dependent claims, and any other independent claim.

The invention claimed is:

1. A method of inkjet printing, comprising:
   printing onto a substrate an inkjet fixing composition comprising a cationic polymer in an amount ranging from greater than about 1 wt % to less than 5 wt. %; an organic acid in an amount ranging from greater than about 0.5 wt % to about 3 wt. %; and a liquid vehicle; and
   printing a latex-containing inkjet ink composition onto the substrate.

2. The method of inkjet printing according to claim 1, wherein the inkjet fixing composition is printed as a pre-treatment onto the substrate before the latex-containing ink composition is printed.

3. The method of inkjet printing according to claim 1, wherein the inkjet fixing composition is printed as an overcoat onto the substrate after the latex-containing ink composition has been printed.

4. The method of inkjet printing according to claim 1, wherein the inkjet fixing composition comprises the organic acid in an amount ranging from greater than about 0.5 wt % to 2 wt. %.

5. The method of inkjet printing according to claim 1, wherein the organic acid in the inkjet fixing composition comprises succinic acid in an amount ranging from greater than about 0.5 wt % to 1 wt. %.

6. The method of inkjet printing according to claim 1, wherein the organic acid comprises succinic acid or citric acid.

7. The method of inkjet printing according to claim 1, wherein the cationic polymer comprises a polyamine.

8. The method of inkjet printing according to claim 1, wherein the inkjet fixing composition comprises the cationic polymer in an amount ranging from greater than about 1 wt % to less than 3 wt %.

9. The method of inkjet printing according to claim 1, wherein the inkjet fixing composition has a pH of 4 of less.

10. The method of inkjet printing according to claim 1, wherein the substrate comprises a non-porous substrate comprising one or more of vinyl, polycarbonate, polytetrafluoroethylene (PTFE), polyester, acrylic, polyethylene, polypropylene, polystyrene, a metal, a ceramic, or a glass.

11. The method of inkjet printing according to claim 1, wherein the monomers from which the latex polymer is formed are selected from ethyl acrylate; ethyl methacrylate; benzyl acrylate; benzyl methacrylate; propyl acrylate; propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropyhiethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; iso-butyl acrylate; iso-butyl methacrylate; 2-ethylhexyl acrylate; 2-ethylhexyl methacrylate; iso-octyl acrylate; iso-octyl methacrylate; and combinations thereof.

12. The method of inkjet printing according to claim 1, wherein the amount of inkjet fixing composition relative to inkjet ink composition printed onto the substrate is less than 20% expressed as a volume percentage.

13. An inkjet fixing composition, comprising:
   a cationic polymer in an amount ranging from greater than about 1 wt % to less than 5 wt. %;
   an organic acid in an amount ranging from greater than about 0.5 wt % to about 3 wt. %; and
   a liquid vehicle.

14. The inkjet fixing composition according to claim 13, wherein the composition is substantially free of colorant.

15. An ink set comprising:
a printhead containing a latex-containing ink composition; and
a further printhead containing an inkjet fixing composition comprising a cationic polymer in an amount ranging from greater than about 1 wt % to less than 5 wt. %; an organic acid in an amount ranging from greater than about 0.5 wt % to about 3 wt. %; and a liquid vehicle.

* * * * *